(No Model.)
B. LANOIZELET.
AGRICULTURAL IMPLEMENT.
No. 279,958. Patented June 26, 1883.
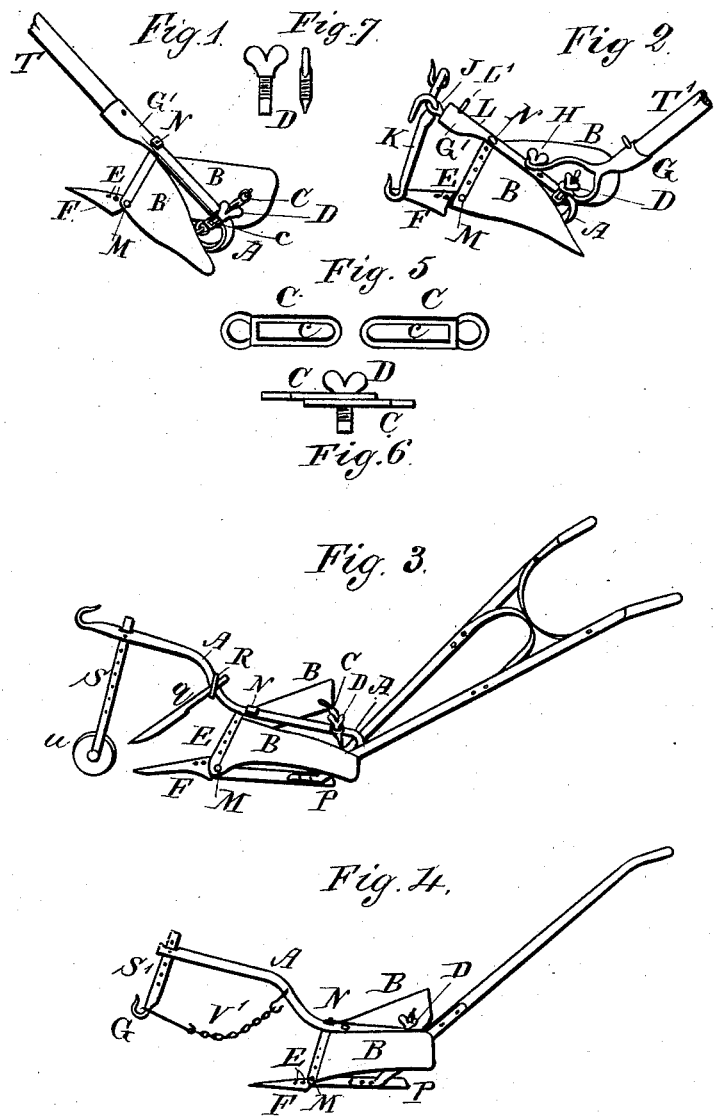

UNITED STATES PATENT OFFICE.

BARTHÉLEMY LANOIZELET, OF BOURBON-LANCY, FRANCE.

AGRICULTURAL IMPLEMENT.

SPECIFICATION forming part of Letters Patent No. 279,958, dated June 26, 1883.

Application filed March 8, 1883. (No model.) Patented in France June 26, 1882, No. 149,759; in Belgium March 3, 1883; in Luxemburg March 3, 1883; in Germany March 3, 1883; in Austria March 3, 1883; in England March 3, 1883; in Italy March 3, 1883; in Portugal March 3, 1883; in Sweden March 3, 1883; in Norway March 3, 1883; in Denmark March 3, 1883, and in Russia March 3, 1883.

*To all whom it may concern:*

Be it known that I, BARTHÉLEMY LANOIZELET, a citizen of the French Republic, and a resident of Bourbon-Lancy, in the French Republic, have invented certain new and useful Improvements in Agricultural Implements for Making Furrows for Sowing Grains, and chiefly for Earthing up Potatoes, (for which I have obtained Letters Patent in France, dated June 26, 1882, No. 149,759; in Belgium, in Lexemburg, in Germany, in Austria, in England, in Italy, in Portugal, in Sweden, in Norway, in Denmark, and in Russia, all bearing date of March 3, 1883;) and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

In the accompanying drawings, Figures 1 and 2 show in perspective my improved cultivator. Figs. 3 and 4 are side elevations, showing a slight modification thereof. Figs. 5, 6, and 7 are detail views.

The object of this invention is to provide a light plow adapted for use as a cultivator, or for laying out the furrows for planting corn and other cereals, and more especially for hilling corn and potatoes. It is composed of a piece, A, of iron, bent at one end and adapted for use as a plow beam and standard. At its forward end it is provided with a socket, G', for the reception of a handle, T, Fig. 1, or a single-tree, K, Fig. 2.

F is a movable plowshare, connected with the beam and standard A by means of two screws, E.

B B indicate two mold-boards, of sheet metal, bent and shaped as shown, and connected with the beam A by means of a pin, M, and a bolt, N. The spread or divergence of the mold-boards is adjusted by means of two slide-bars, C, provided with longitudinal slots c, and a thumb nut and screw, D, that passes through the bars and the beam A, as shown, Figs. 1, 2, and 3, and in detail in Figs. 5 and 6, said screw D having its lower end wedge-shaped to adapt it for use as a screw-driver. As will be seen, the two mold-boards B may be readily removed and replaced by others when worn, or by others of different form, according to the nature of the work the plow is to perform, several forms of such mold-boards being shown in the drawings.

Upon the rear portion of the beam A is secured, by means of the thumb nut and bolt D, and a like thumb nut and bolt, H, a socket, G, Fig. 2, for the reception of a handle, T, for guiding the plow when drawn by a small draft-animal—such as an ass, for instance.

J indicates a ring or eyebolt, to which the single-tree K is hooked, said eyebolt being secured within the socket G' by means of a bolt, L'.

The cultivator shown in Figs. 3 and 4 is more particularly adapted for cultivation on a large scale, and is constructed substantially like that shown in Figs. 1 and 2, and as described hereinabove, except that it may be provided with double handles and a sole-plate, P, to avoid the too speedy wear of the plow-standard. It is further provided with a colter, q, secured to the beam in a loop, R, by means of two screws, and with means for regulating the depth of plowing, which may be a guide and regulating wheel, u, mounted on an adjustable standard, S, that passes through a slot in the beam A, as shown in Fig. 3; or it may be a draft-bar, S', and chain V', as shown in Fig. 4, the single-tree being hooked to the hook G, formed at the end of the draft-bar S'.

Having thus described my invention, what I claim is—

1. The plow-beam A, curved to form the plow-standard, and provided at its front end with a socket, L, in combination with the detachable socket G, substantially as and for the purposes specified.

2. The plow-beam A, constructed as described, and the mold-boards B B and handle-socket G, in combination with the adjusting-plates C C and the thumb nuts and bolts D H, substantially as and for the purposes specified.

In testimony that I claim the foregoing I have hereunto set my hand this 20th day of January, 1883.

BARTHÉLEMY LANOIZELET.

Witnesses:
LANOIZELET, *Cordonnier*,
CANTAT FRANÇOIS.